July 29, 1952　　　　　B. WALKER　　　　　2,604,884
BARBECUE AND COOKING STAND
Filed Jan. 19, 1948

INVENTOR.
Brooks Walker ined July 29, 1952

2,604,884

UNITED STATES PATENT OFFICE 2,604,884

BARBECUE AND COOKING STAND

Brooks Walker, Piedmont, Calif.

Application January 19, 1948, Serial No. 3,035

2 Claims. (Cl. 126—30)

This invention relates to a barbecue support for cooking meat and other edible foods which can be cooked on a grill over a fire, as well as a device for supporting cooking utensils over a barbecue fire or a camp fire or a backyard barbecue grill. One of the objects of this invention is to provide a readily adjustable grill which can be adjusted in height over varying heights of fires or fires of varying degrees of heat for cooking fast or slow. Another feature of the invention is to provide a support for an adjustable barbecue which can be readily inserted in a fireplace under a bonfire as on a beach, picnic, on a camping bonfire, or used in a prepared backyard brick, raised barbecue pit to provide a readily adjustable grill on which foods may be cooked, and which is also suitable for supporting cooking utensils at varying heights. Another object of this invention is to provide a suitable support for an adjustable grill or cooking support with supporting arms which can readily be inserted under a fire of the type previously described and on which the grill is supported from a single support away from the fire with a handle extending, also away from the fire, which can be readily used for raising and lowering the grill relative to its support and can also be used for raising the grill off from the support for removal for more ready serving or preparing of the foods which have been cooked on the grill at a place remote from the fire. Another object is to provide a device of this character which is simple in its construction, effective in its action, and economical to manufacture, which can be folded into a compact package for ready storage or transportation.

Further objects of this invention will appear from the detailed description taken in connection with accompanying drawings in which.

In all figures, like numerals of reference refer to corresponding parts in the various figures.

Figure 1:
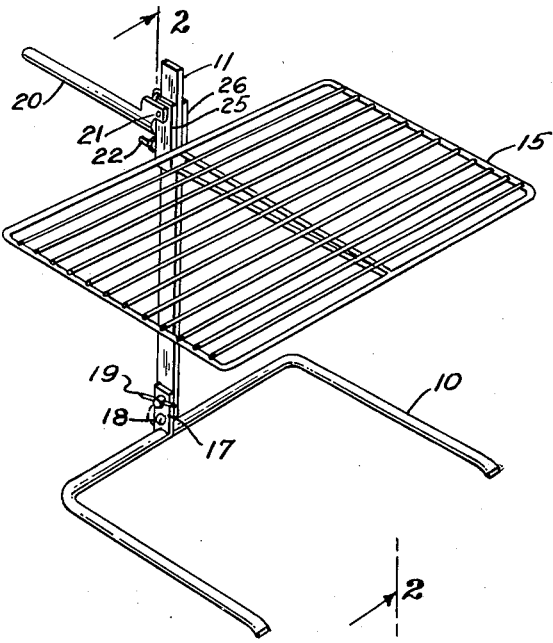
Figure 1 is a perspective view of a device embodying one form of this invention.
Figure 3:
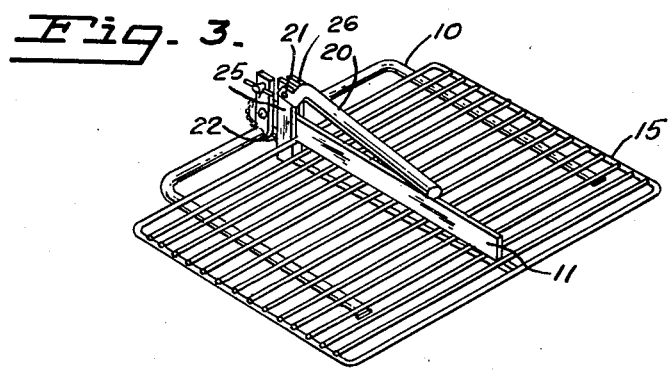
Figure 3 is a perspective view of the device shown in Figure 1, folded for compact packing.
Figure 2:
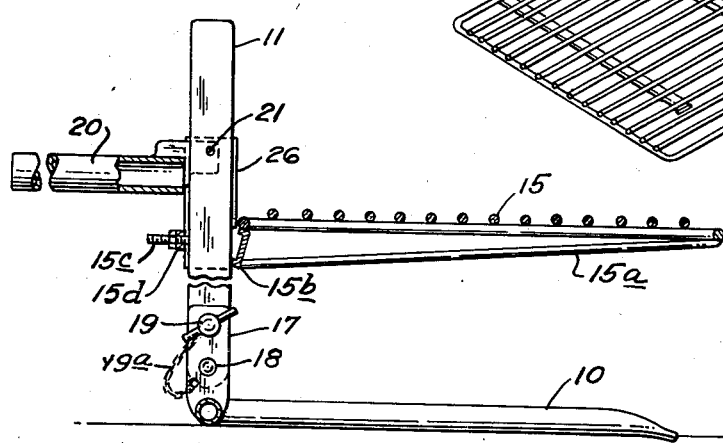
Figure 2 is a side view, partly cut away, of the construction shown in Figure 1.

Referring to Figures 1 through 3, I have shown a U-shaped support 10 which may be formed of solid or tubular material bent so as to offer two substantially straight arms relatively underneath the grill 15, and a connecting portion on which is welded a vertical support 17 to which is pivoted at 18 a vertical member 11, a screw 19 or slidable pin 19 is preferably detachably secured by chain 19a to prevent its loss when the device is demounted as shown in Figure 3 for more compact packing and transportation. A handle 20 is pivoted at 21 to each of the side plates 25 and 26 which act as side guides for horizontal stability of the grill 15 relative to the vertical member 11 of the supporting stand. This pivoting of the handle 20 allows it to fold in packing or shipping as shown in Figure 3. The gripping of the grill on the vertical member at the various heights is accomplished by the bight between set screw 15c which is adjustable for leveling the grill in case of manufacture or bending in operation and the heel 15b formed by a cross piece between the two side plates 25 and 26 at the point where the brace 15a is attached by welding or other suitable means. The set screw 15c is threaded through a cross bar 15d secured at opposite ends to the side plates 25 and 26. Brace 15a stiffens the grill and makes it much more rigid relative to the side plates 25 and 26 and the supporting member 11. In operation, the lower support 10 is slid in over the hearth under the coals if the barbecue of food support is to be used for cooking in a home fireplace or, if it is to be used in a beach or camping fire the supports 10 are slid under the fire. In a like manner they can rest in a prepared, raised box as might be made of brick or rock in a back yard for outdoor cooking, if desired. The vertical member 11 has been previously raised and secured by pin or screw 19 and the height of the grill can then be readily adjusted by manual operation of the handle 20 which when tilted so that the arch of the grill 15 away from the vertical support 11 is tilted upwardly the bight between set screw 15c and heel 15d is released and the grill can be readily raised or lowered to any desired height. When the weight of the grill is then supported by the vertical member by releasing the tilting pressure on the handle 20, the grip between set screw 15c and heel 15b secures the grill readily at any desired height. For more secure holding, it may be desirable to slightly notch either edge of vertical member 11; this would provide a large number of positive positions for the grill in height from the supporting arms 10 with a little bit more positive retention than is obtained by the locking action of the set screw and heel on plain surfaces. However, the operation on the plain surfaces is well known and is very positive in action. When it is desired to fold the device for compact packing or storage, the grill is first lifted off of the top of vertical member 11, pin 19 is then removed or unscrewed, the grill is then inserted on member 11 as shown in Figure 3 and handle 20 folded so that the stand and the grill and the handle form a compact package very little larger than the grill itself. A pan suitable for holding charcoal or other combustible material may be supported on arms 10 or may be supported on another device somewhat similar to the grill support also mounted on vertical rod 11, if it is desired that coals support be provided other than in a usual fireplace or bonfire.

It is obvious that various changes may be made in details of construction without departing from the spirit of this invention; it is, therefore, to be understood that this invention is not to be limited to the specific details shown and described.

I claim as my invention:

1. A support for holding food over a fire, comprising a base of substantially C-shape, an upright bar secured to the medial portion of the base, a second bar pivoted to the first mentioned bar and extending in the same upwardly direction when in extended position, means for locking the two bars in extended position and in alignment, a grill, a handle for the grill, intermediate spaced plates between the grill and the handle and joining the two, the handle being pivoted to the two spaced plates a connecting bar for the two spaced plates, an adjustable set screw passing through the bar connecting the said plates and extending between the same to engage the second named bar, a bight mounted on the grill and extending between the plates and spaced from the set screw and engaging the second named bar on the opposite side thereof to the set screw and outside the horizontal plane thereof when the second named bar is inserted between the two plates, the set screw and the bight holding the grill in adjustable vertical positions on the second named bar.

2. A collapsible support for food being cooked comprising a horizontal base of substantially C shape, a vertical bar secured thereto, a second bar pivoted to the first bar at a position spaced from the base so that folding of the second bar adjacent to the base provides a space therebetween, means for locking the two bars in alignment, and a detachable grill slidable to adjusted position on the second bar when in use and when detached received in the aforementioned space, said pivot being spaced above said base a distance slightly higher than the thickness of the grill whereby the extremities of the C-shaped base supports the grill at respective ends and the second bar clamps the grill at a medial portion thereof to provide a compact unit.

BROOKS WALKER.

REFERENCES CITED

The following references are of record in the file of this patent:

UNITED STATES PATENTS

| Number | Name | Date |
|---|---|---|
| 1,207,778 | McMaster | Dec. 12, 1916 |
| 1,464,279 | Hindley | Aug. 7, 1923 |
| 1,893,799 | Harrington | Jan. 10, 1933 |
| 2,104,072 | Carr | Jan. 4, 1938 |
| 2,150,397 | Owen | Mar. 14, 1939 |
| 2,202,265 | Phillips | May 28, 1940 |
| 2,299,683 | Curtis | Oct. 20, 1942 |

FOREIGN PATENTS

| Number | Country | Date |
|---|---|---|
| 341,034 | Italy | of 1936 |